(12) United States Patent
Bolla

(10) Patent No.: US 11,443,310 B2
(45) Date of Patent: Sep. 13, 2022

(54) ENCRYPTION BASED SHARED ARCHITECTURE FOR CONTENT CLASSIFICATION

(71) Applicant: PayPal, Inc., San Jose, CA (US)

(72) Inventor: Raja Ashok Bolla, Austin, TX (US)

(73) Assignee: PayPal, Inc., San Jose, CA (US)

(*) Notice: Subject to any disclaimer, the term of this patent is extended or adjusted under 35 U.S.C. 154(b) by 378 days.

(21) Appl. No.: 15/847,622

(22) Filed: Dec. 19, 2017

(65) Prior Publication Data

US 2019/0188702 A1 Jun. 20, 2019

(51) Int. Cl.
G06Q 20/38 (2012.01)
H04L 9/14 (2006.01)
H04L 9/30 (2006.01)
H04L 9/32 (2006.01)

(52) U.S. Cl.
CPC .......... *G06Q 20/3829* (2013.01); *H04L 9/14* (2013.01); *H04L 9/30* (2013.01); *H04L 9/3239* (2013.01); *H04L 9/3247* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 6,286,098 B1* | 9/2001 | Wenig | ................ | H04L 63/0442 |
| | | | | 713/151 |
| 7,315,826 B1* | 1/2008 | Guheen | .............. | G06Q 30/0201 |
| | | | | 705/7.29 |
| 7,577,739 B2* | 8/2009 | Donahue | ................ | H04L 43/00 |
| | | | | 709/224 |
| 8,554,601 B1* | 10/2013 | Marsh | ................ | G06Q 30/0278 |
| | | | | 705/7.32 |
| 2006/0253579 A1* | 11/2006 | Dixon | .................... | G06Q 30/02 |
| | | | | 709/225 |
| 2007/0180388 A1 | 8/2007 | Izhikevich | | |
| 2008/0059891 A1 | 3/2008 | Herzog | | |

(Continued)

FOREIGN PATENT DOCUMENTS

CN 107832925 A * 3/2018 ........... G06F 40/279

OTHER PUBLICATIONS

B. Namasivayam, "Categorization of Phishing Detection Features and Using the Feature Vectors to Classify Phishing Websites", Aug. 2017, Arizona State University. (Year: 2017).*

(Continued)

*Primary Examiner* — Neha Patel
*Assistant Examiner* — Clay C Lee
(74) *Attorney, Agent, or Firm* — Haynes and Boone, LLP

(57) ABSTRACT

Encryption operations using private and public cryptographic signature keys may be used to facilitate secure and uniquely identifiable audit records relating to website content classification. Blockchain may be used to facilitate collection, storage, and sharing of encrypted audit records. Based on shared encrypted information (e.g. from the blockchain or elsewhere) a content evaluation consensus may be formed. Collections of encrypted audit records may be processed and results of the processing may also be shared via the blockchain. Subsequent operations can include sharing of the processing results.

20 Claims, 4 Drawing Sheets

(56) References Cited

U.S. PATENT DOCUMENTS

| | | |
|---|---|---|
| 2008/0109369 A1 | 5/2008 | Su et al. |
| 2008/0216106 A1 | 9/2008 | Maxwell et al. |
| 2008/0228580 A1 | 9/2008 | Korman et al. |
| 2009/0049046 A1 | 2/2009 | Godzik et al. |
| 2009/0063535 A1 | 3/2009 | Petri |
| 2009/0144164 A1* | 6/2009 | Wane .................... G06Q 20/10 235/383 |
| 2011/0130886 A1* | 6/2011 | Drees .................... G05B 15/02 700/291 |
| 2012/0209669 A1 | 8/2012 | Zealer |
| 2012/0209670 A1 | 8/2012 | Zealer |
| 2012/0259866 A1 | 10/2012 | Austin |
| 2012/0323842 A1 | 12/2012 | Izhikevich et al. |
| 2013/0014209 A1 | 1/2013 | Chastagnol |
| 2013/0339443 A1 | 12/2013 | Goldman |
| 2015/0012383 A1 | 1/2015 | Touboul et al. |
| 2015/0088622 A1 | 3/2015 | Ganschow |
| 2015/0103248 A1 | 4/2015 | Zealer |
| 2017/0103472 A1* | 4/2017 | Shah .................. G06K 9/00597 |
| 2017/0116873 A1 | 4/2017 | Lendvay et al. |
| 2017/0140394 A1* | 5/2017 | Cao ...................... H04L 9/3236 |
| 2017/0279783 A1* | 9/2017 | Milazzo .................. B29C 64/00 |
| 2018/0150865 A1* | 5/2018 | Arora .................. G06Q 30/0207 |
| 2019/0043095 A1* | 2/2019 | Grimaud ............... G06F 16/951 |
| 2019/0109717 A1* | 4/2019 | Reddy .................. H04L 9/0643 |
| 2020/0311790 A1* | 10/2020 | Keren .................. G06F 16/2379 |

OTHER PUBLICATIONS

Mougayar, William "Blockchain Apps: Moving from the Jungle to the Zoo", [Online] [retrieved on Nov. 28, 2017]. Retrieved from the Internet: <URL: http://startupmanagement.org/2014/12/30/blockchain-apps-moving-from-the-jungle-to-the-zoo/>, Dec. 30, 2014.

Mougayar, William, "Understanding the blockchain", [Online] [retrieved on Nov. 28, 2017]. Retrieved on the Internet: <URL: https://www.oreilly.com/ideas/understanding-the-blockchain>, Jan. 16, 2015.

William Mougayar, "Blockchain Apps: Moving from the Jungle to the Zoo," http://startupmanagement.org/2014/12/30/blockchain-apps-moving-from-the-jungle-to-the-zoo/, Dec. 30, 2014.

William Mougayar, "Understanding the blockchain, We must be prepared for the blockchain's promise to become a new development environment," https://www.oreilly.com/ideas/understanding-the-blockchain, Jan. 16, 2015.

* cited by examiner

ENCRYPTION BASED SHARED ARCHITECTURE FOR CONTENT CLASSIFICATION

TECHNICAL FIELD

This disclosure relates to encryption operations using private and public cryptographic signature keys to facilitate consensus content evaluation via secure and uniquely identifiable audit records relating to website content classification according to various embodiments.

BACKGROUND

Website classification is important various parties, particularly concerning website transactions. Nonetheless, performing such classification can be an arduous and labor-intensive process. Such conventional classification processes also do not provide secure encrypted identification of classifiers within the context of a greater architecture allowing for consensus building using encryption techniques to verify identity and preserve information.

DETAILED DESCRIPTION

Figure 1:
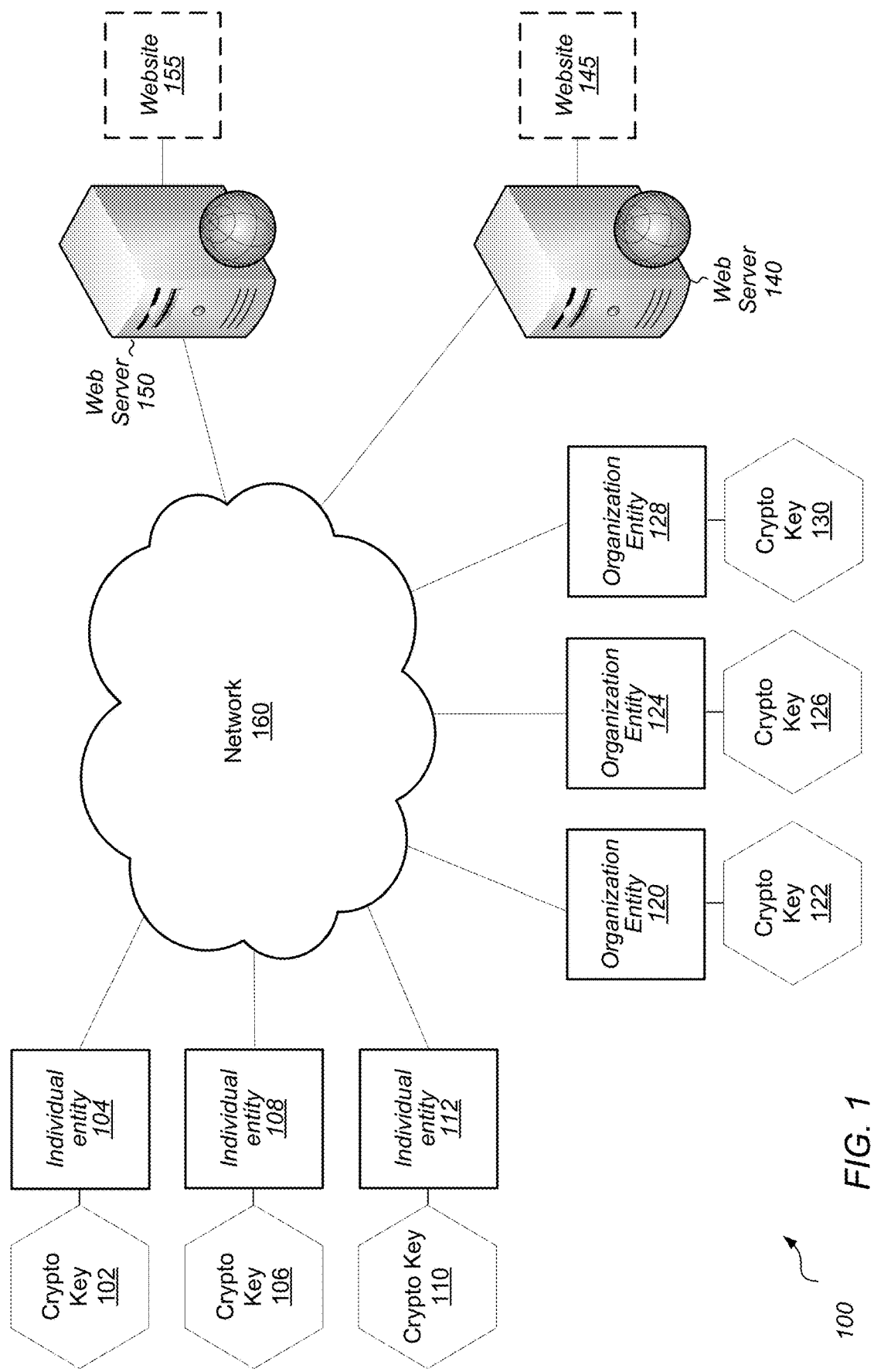
FIG. 1 illustrates a block diagram of a system that includes individual entities and their associated cryptographic keys, as well as organization entities and their associated cryptographic keys, along with web servers, according to some embodiments.

Internet web sites may have a wide variety of content, and may sell many different goods and services. Sometimes, these goods and services are not legal, however. In various jurisdictions, sale of certain things may be regulated (e.g., prescription drugs, alcohol) or simply forbidden (e.g., automatic weapons, sex services).

An acceptable use policy (AUP) can be used by an electronic payment services provider to make sure that applicable laws and regulations are complied with. An AUP may also optionally forbid or regulate transactions involving certain types of content even where such transactions might otherwise be legal.

In order to enforce AUPs, internet websites are often monitored. This is often a time-consuming task performed by human evaluators. An evaluator may review a web site's content to determine if the site is violating an AUP by selling forbidden goods or services, for example (or selling regulated goods or services without necessary regulatory compliance). Some AUP violations may be obvious, while some may be less easily detected. In other instances, machine learning classifiers can be used to help expedite the categorization of different internet domains.

A website's content can be assessed relative to different AUP categories. A human classifier might score a website in a variety of classifications (e.g. the website is not selling weapons, the website is not selling tobacco, the website IS selling prescription drugs, etc.). By reviewing assessing different web pages on a site, an overall composite score can be obtained as to whether the website is in violation of an AUP (and which sections of the AUP are being violated). A machine learning classifier can also assess AUP content category scores (which may be done on a confidence scale such as 0 to 100).

Websites can change over time, however. A "known good" website could in the future begin to violate an AUP even if it was previously in compliance. Further, there are millions of online merchants across the globe. It is difficult for a single organization to track all of these merchants in a reliable manner. However, it may be the case that some organizations and individuals know something about the website content of a first set of merchants, while other entities know something about the website content of a second set of merchants.

By establishing an encryption-based architecture to securely generate and share such information, duplicate efforts can be eliminated, greatly reducing the usage of both machine resources and human resources by organizations relying on AUP compliance information.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes individual entities and their associated crypto (cryptographic) keys, as well as organization entities and their associated crypto keys. The diagram also depicts web servers that correspond to particular websites. Thus, the diagram of FIG. 1 shows overall aspects of an ecosystem in which the techniques below can be deployed, in various embodiments. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

The ecosystem of FIG. 1 includes both individuals and organizations. Individual entities 104, 108, and 112 may correspond to individual persons who may be situated anywhere on the globe. In some cases, these persons may be relatively unknown persons—e.g., people who may not have provided identifying credentials to one of the organizations.

Nonetheless, these individuals may be uniquely identifiable in the ecosystem through the use of their associated crypto keys 102, 106, and 110. Thus, individual entity 104 can encrypt information with crypto key 102 (which may be privately maintained by individual entity 104), and a corresponding public key (not depicted) can be used to verify that the information was signed by that entity.

Organization entities 120, 124, and 128 may correspond to particular organizations, which may be financial entities in some embodiments. Thus, these entities can include an electronic payment transaction service provider such as PayPal™, a credit card network operator such as VISA™ or DISCOVER™, an issuing bank or an acquirer bank, or any other such entity. Organization entities may thus be legal entities, such as businesses or charities, in various instances, but are also not limited to financial entities.

Web servers 140 and 150 correspond to websites 145 and 155, respectively. These websites can be any website on the Internet in various embodiments. In many cases, these websites include goods and services for sale by merchants who utilize an organization entity to help facilitate payments.

Websites 145 and 155 may therefore include a variety of content that is descriptive of the goods and services being sold. In some instances, however, items being sold may be in violation of an acceptable use policy (AUP) that applies to the website. Various companies such as PayPal™, credit card companies, banks, etc. may disallow sales off certain items, due to illegality, regulations, transaction risk, or for other reasons. As described below, such organizations have an interest in ensuring that their merchants are abiding by the terms of applicable AUPs, however, the resources needed to ensure such compliance can be costly.

Figure 2:
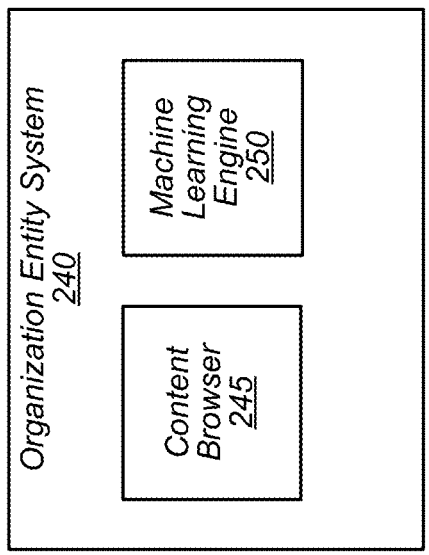
FIG. 2 illustrates a block diagram of two computer systems that may be used within the present architecture, according to some embodiments.
Figure 2:
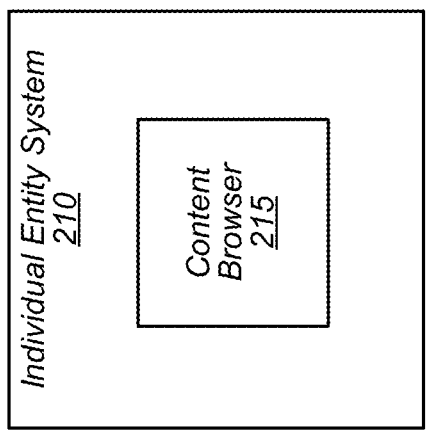

Turning to FIG. 2, a block diagram 200 is shown illustrating two computer systems that may be used within the present architecture, according to some embodiments. As shown, this figure includes an individual entity (IE) system 210 and an organization entity (OE) system 240. These systems may correspond, respectively, to individual entities (such as 104, 108, and 112) and organization entities (such as 120, 124, and 128).

IE system 210 includes a content browser 215, which can be used to view website or other internet content in a variety of embodiments. This browser may be commercially available software such as the GOOGLE CHROME browser, MICROSOFT INTERNET EXPLORER, APPLE SAFARI, MOZILLA FIREFOX, or any other number of web browsers. Content browser is not limited to such examples, however, and may include other software. IE system 210 may be a laptop computer, desktop computer, smartphone, tablet computer, etc.

A user of IE system 210 may therefore review various merchant web content using content browser 215. The user may be able to determine whether a particular website violates one or more categories of an AUP based on her viewing experience through content browser 215. The resulting audit information (whether a website is violating one or more AUP categories) can be used in techniques described below.

OE system 240 may be operated by any user associated with an organization such as organization entities 120, 124, and 128. This system includes a content browser 245 and a machine learning engine 250 in the embodiment shown. Content browser 245 may be similar to content browser 215, and allow a corporate user to manually assess whether a particular website is violating one or more AUP categories. Machine learning engine 250 may utilize various machine learning techniques to automatically assess AUP content category violations for websites using a trained classifier.

Figure 3:
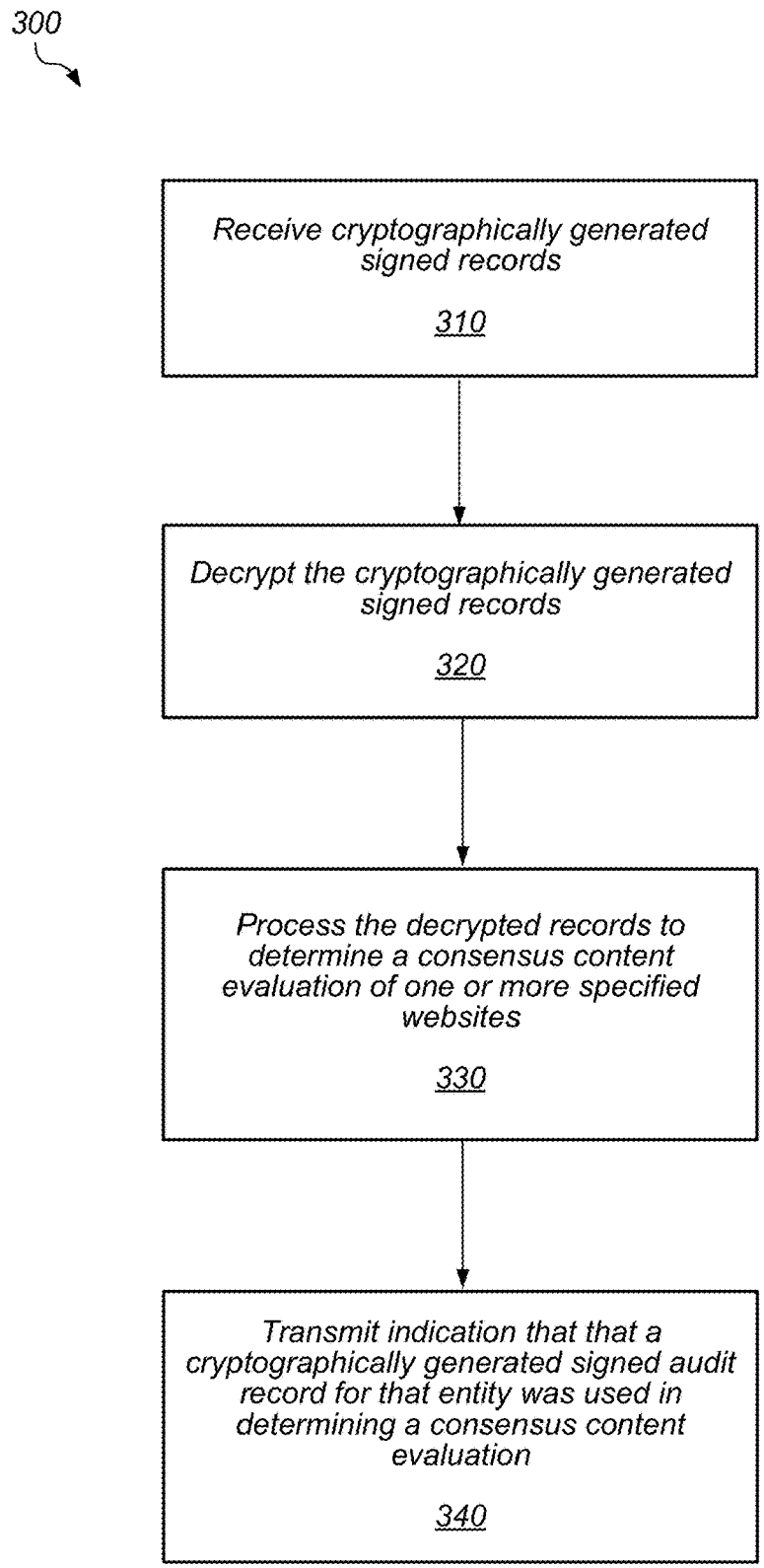
FIG. 3 illustrates a flow diagram is shown of a method that relates to determining a consensus content evaluation using cryptographically signed audit records, according to various embodiments.

Turning to FIG. 3, a flow diagram is shown illustrating a method 300 that relates to determining a consensus content evaluation using cryptographically signed audit records, according to various embodiments.

Operations described relative to FIG. 3 may be performed, in various embodiments, by any suitable computer system and/or combination of computer systems, including organization entity (OE) system 240. For convenience and ease of explanation, however, operations described below will simply be discussed relative to OE system 240. Further, various elements of operations discussed below may be modified, omitted, and/or used in a different manner or different order than that indicated. Thus, in some embodiments, OE system 240 may perform one or more aspects described below, while another system might perform one or more other aspects.

In operation 310, OE system 240 receives a plurality cryptographically generated signed audit records transmitted by a plurality of entities, according to various embodiments. These cryptographically generated signed audit records may be generated using a plurality of private cryptographic signature keys for the plurality of entities. These received audit records may contain a review of AUP content categories for one or more websites.

Thus, operation 310 can include an organization (such as PayPal™) receiving cryptographically generated signed audit records from a variety of individuals located throughout a country and/or located throughout the world. Each of the audit records can be individually signed using a private cryptographic key for that individual. The individual may likewise have a corresponding public cryptographic key (which may be used in remuneration for the audit records as further discussed below).

The audit record can include scores and/or ratings for a variety of content categories. Such categories can include, in various embodiments items that (1) violate any law, statute, ordinance or regulation; (2) relate to transactions involving (a) narcotics, steroids, certain controlled substances or other products that present a risk to consumer safety, (b) drug paraphernalia, (c) cigarettes, (d) items that encourage, promote, facilitate or instruct others to engage in illegal activity, (e) stolen goods including digital and virtual goods, (f) the promotion of hate, violence, racial intolerance or the financial exploitation of a crime, (g) items that are considered obscene, (h) items that infringe or violate any copyright, trademark, right of publicity or privacy or any other proprietary right under the laws of any jurisdiction, (i) certain sexually oriented materials or services, (j) ammunition, firearms, or certain firearm parts or accessories, or (k) certain weapons or knives regulated under applicable law; (3) relate to transactions that (a) show the personal information of third parties in violation of applicable law, (b) support pyramid or ponzi schemes, matrix programs, other "get rich quick" schemes or certain multi-level marketing programs, (c) are associated with purchases of annuities or lottery contracts, lay-away systems, off-shore banking or transactions to finance or refinance debts funded by a credit card, (d) are for the sale of certain items before the seller has control or possession of the item, (e) are by payment processors to collect payments on behalf of merchants, (f) are associated with the sale of traveler's checks or money orders, (h) involve currency exchanges or check cashing businesses, (i) involve certain credit repair, debt settlement services, credit transactions or insurance activities, or (k) involve offering or receiving payments for the purpose of bribery or corruption; and (4) involve the sales of products or services identified by government agencies to have a high likelihood of being fraudulent. Content categories are not limited to the above, however.

A blockchain may be used to store cryptographically generated signed audit records in various embodiments. Individual entities and/or organization entities may be used as storage nodes to store the blockchain records in various embodiments. Thus, once an audit record has been created, it can be stored in a tamper proof format on the blockchain due to its encryption using a private key (e.g. for an individual entity). The blockchain can be public (viewable by anyone), or various degrees of private (viewable by individual entities and/or organization entities, viewable by only some of either type of entity and/or viewable only after a period of time, or viewable only by one or more organization entities).

In operation 320, OE system 240 decrypts the plurality of cryptographically generated signed audit records using a plurality of public cryptographic signature keys that are for the plurality of entities and that correspond to the private cryptographic signature keys, according to some embodiments.

As indicated above, various individual entities may have private cryptographic signature keys that can be used to sign an audit record. Public keys for these entities may be available via a blockchain or any other digital information distribution mechanism (e.g. website). Thus, operation 320 can include examining the private key for identity information, then locating an appropriate public key corresponding to the private key to perform decryption of an audit record. The audit records are signed for at least two reasons, in various embodiments: (1) to provide a unique identity for the reviewer who created the audit record and (2) to allow additional transactions (such as remuneration) using the unique identity.

In operation 330, OE system 240 processes the decrypted audit records to determine a consensus content evaluation, according to some embodiments. The consensus content evaluation may relate to one or more specified websites, and the processing may include determining a first group of one or more of the plurality of entities that contributed to the determined consensus content evaluation. Thus method 300 can also include determining a consensus content evaluation based on the audit records.

Processing the audit records can include parsing each of the records to see what content ratings have been assigned by reviewers. In many instances, this may be a simple "yes/no" as to whether a particular website has certain types of content. E.g. a reviewer may answer questions such as "does the website offer firearms for sale (yes or no)?" Audit reports can thus include binary responses. An audit report may also include no ranking, or "unsure" as response. Thus a reviewer might answer yes or no for a variety of AUP content categories, and provide no answer or "unknown" for one or more categories. In some cases a confidence rating may be assigned by the reviewer as well, e.g., 100% confident a website does not offer firearms for sale, 80% confident that the website is offering illegal drugs for purchase, etc. As will be appreciated, audit reports can be in a variety of formats in different embodiments, and parsing software instructions may vary by embodiment in order to extract the relevant information from the audit reports.

After parsing, a consensus content evaluation may be determined based on information in the audit records. In various instances, this includes analyzing a group of audit records to see if different individual entities have reached similar conclusions about the content of the same websites. For example, if 100 individuals have reviewed a particular website, and 95 of those individuals state that the website offers firearms for sale, OE system 240 may determine that a consensus has been reached that the website does indeed appear to offer firearms for sale. Determining that a consensus exists may include determining a degree of consistency between different audit reports. Determining a degree of consistency may be based on receiving a certain threshold number of reports having the same or similar findings as further discussed below.

Different thresholds may be used to determine a consensus. In some instances, a threshold number of audit records may be required (e.g. no consensus is determined if a website has only been reviewed 3, 5, 10, 20, or some other number of times). In some instances, based on the number of reviews in the audit records, different thresholds may be used to determine a consensus. For example, if 20 reviews are received, consensus may require that 19 of the 20 agree on a content category. If 50 reviews are received, consensus might be slightly lower (in percentage terms), and only 45/50 might need to be in agreement. Various different consensus rules may be used based on different thresholds.

In some embodiments in which confidence scores are used for audit records, determining a consensus may also be based on these confidence scores. For example, if the average confidence score is 90% that a site is selling firearms, that may be deemed a high enough threshold to establish a consensus. This can also be done by discarding outliers, e.g., throwing out a certain number of high or low scores (e.g. discarding the highest and lowest two scores, or some other number).

If one or more particular audit records therefore deviates by at least a threshold amount from at least two other audit records, those particular audit records may be discarded for the purposes of determining the consensus. Note that this deviation may be measured across multiple categories. For example, if out of ten categories, a particular number (perhaps 90% or some other amount) of reviewers may indicate that categories 1, 3, and 5 are positive (e.g. certain types of goods are being sold) and the remaining categories are negative (e.g. the website does not appear to be selling certain other types of goods). Another particular audit record, however, may indicate that categories 1, 8, 9, and 10 are positive, while the others are negative. This review substantially deviates from what appears to be general agreement by the other audit records. Thus, this review may be discarded in its entirety as being unreliable for purposes of determining a consensus content evaluation (even if the review correctly identified category 1 as being positive). Different metrics may be used to determine when to discard a review for these purposes. If a review deviates in more than 20% of categories (or some other number), for example, it may be discarded, or if a review deviates by more than a threshold number of categories (e.g. at least 4 categories are different from an apparent consensus by others). Thus, operation 330 may include comparing each audit record to each other audit record to determine which records should be excluded from the consensus calculations. Note that in some cases, multiple records may be discarded, and the determination of which records to discard may be based on less than all of the other records (e.g., 18 out of 20 audit records may be relatively consistent with one another, at least within threshold amounts, while 2 of the 20 audit records may be substantial outliers from the group of 18—in which case both of the 2 may be discarded).

Operation 330 may therefore include determining a consensus content evaluation based on various decrypted audit records. The consensus content evaluation may be in the format of an electronic report indicating the consensus of reviewers for various ones of a plurality of content categories (e.g. AUP categories). The consensus content evaluation may include ratings for all content categories, or a subset. In general, operations discussed above may be performed for one or more categories—thus, it may be the case that a consensus is reached on certain categories but not others. In such a case, the consensus content evaluation might include information such as Positive: categories 1, 2, 6; Negative: categories 3, 4, 5, 8, 10; Unknown: categories 7 and 9. Confidence average scores may also be used in some embodiments (e.g. category 1, positive 95%). In some instances, OE system 240 may wait until a certain number of categories have achieved consensus. E.g., if consensus only exists for 6 out of 15 categories, OE system 240 may wait for a higher number of categories to take further action relative to the determined consensus content evaluation (e.g. waiting until 70% of categories have consensus, or 13/15 categories, or some other threshold).

Once a consensus content evaluation has been reached, a variety of actions can be taken. In some instances, OE system 240 may generate an electronic message to one or more individuals indicating that a web site should be further reviewed by trusted personnel. For example, before taking action against a merchant (e.g. suspending or closing a transaction account used to conduct business via the website), a trained investigator employed or contracted by an organization entity may investigate the website for categories alerted based on the consensus. Human resources may be conserved, however, by having the investigator manually review only certain categories—if a website has a high degree of confidence (based on the consensus) that 14 of 15 categories are negative, but the website has a positive indication for firearm sales, then the investigator may only need to manually review for firearms, instead of all categories. This can represent a significant savings in labor. In other instances, however, a payment transaction account associated with a merchant can be immediately suspended or terminated based on the consensus content evaluation (possibly pending further review by an investigator). Additionally, as discussed below, content reviewers can be transmitted a remuneration (which may serve as letting an individual entity know that his or her audit record proved useful to an organization entity).

a

In operation 340, OE system 240 transmits, to each entity in a first group of entities, an indication that a cryptographically generated signed audit record for that entity was used in determining a consensus content evaluation, according to various embodiments. This indication may be in the form of a blockchain payment, in some embodiments, or any other payment scheme (flat currency, gift cards, etc.). Only entities that have contributed a useful content review (e.g. not discarded) may be given remuneration in various embodiments. In the case of blockchain payment, some type of digital payment ("coin") may be made to reviewers. This coin may then be redeemed with an organization entity to receive a tangible reward (money, goods or services, etc.).

Note that audit record information, as well as determined consensus content evaluations, can be shared with various organization entities (via a blockchain or other means). Once an organization entity has determined a consensus content evaluation, for example, the OE may store the consensus content evaluation (CCE) on a blockchain. The CCE may be encrypted using a private cryptographic signature key corresponding to the organization entity that generated the CCE. Other organization entities might then decide to use the CCE for their own purposes. For example, if PayPal™ creates a CCE that indicates a website has been scored in a variety of AUP content categories, another OE such as a credit card company, bank, etc., might also take advantage of that CCE and use it to determine whether a trusted human investigator should spend their time to browse a particular website. CCEs can also be shared by non-blockchain means as well (email transmission, file sharing protocols, etc.).

Contributors of audit records (e.g. individual entities) can also build up a reputation score in some embodiments. This reputation score can be based on the information in the blockchain. An organization entity (OE) can review the blockchain and see how many times a particular individual (based on their cryptographic signature) has contributed reviews. Information about whether an individual's audit record was used can also be stored on the blockchain (or in another format suitable for sharing). For example, PayPal™ could store information indicating that particular individuals (as denoted by their public and/or private cryptographic signature key and/or other identifying information) had an audit record that was used or discarded in generating a consensus content evaluation (CCE). If a user's audit record was used for the CCE, the user may gain reliability reputation (which can be expressed as a score that can go up or down for example). A higher score can indicate the user has submitted multiple useful audit records for CCEs. A lower score may indicate the user is unreliable or unproven. In some instances, a reputation score may be used to weight audit records provided by various users. Thus, when determining a CCE, a highly reliable user might have her audit record weighted at a relative value of 250%, while a new user might have his audit record weighted at 80%. A user with multiple rejected reviews could have his audit record weighted even lower (e.g. 30%). Various different adjustment schemes (e.g. different percentages) based on reputation weight are possible; the above are merely examples.

Computer-Readable Medium

Figure 4:
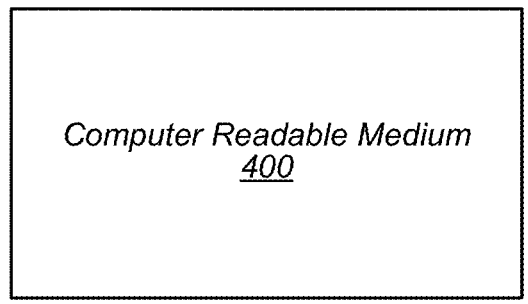
FIG. 4 is a diagram of a computer readable medium, according to some embodiments.

Turning to FIG. 4, a block diagram of one embodiment of a computer-readable medium 400 is shown. This computer-readable medium may store instructions corresponding to the operations of FIG. 3 and/or any techniques described herein. Thus, in one embodiment, instructions corresponding to operating entity system 240 may be stored on computer-readable medium 400.

Note that more generally, program instructions may be stored on a non-volatile medium such as a hard disk or FLASH drive, or may be stored in any other volatile or non-volatile memory medium or device as is well known, such as a ROM or RAM, or provided on any media capable of storing program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 5:
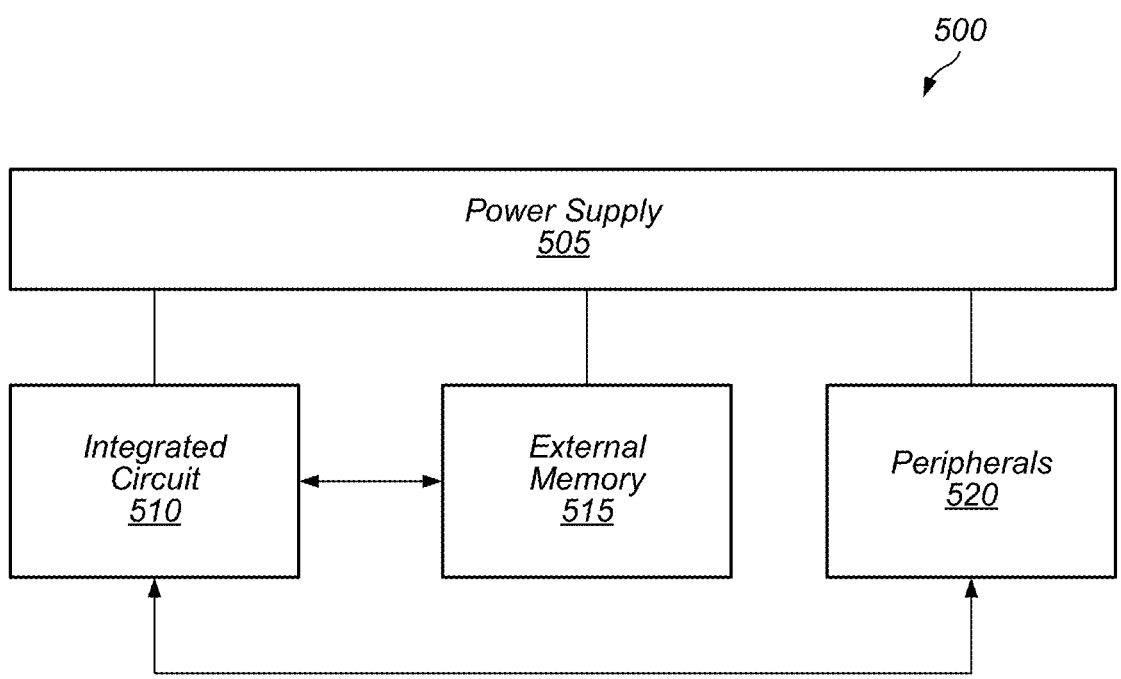
FIG. 5 is a block diagram of a system, according to some embodiments.

In FIG. 5, one embodiment of a computer system 500 is illustrated. Various embodiments of this system may be operating entity system 240, individual entity system 210, or any other computer system as discussed above and herein.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as wifi, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a non-transitory memory; and
one or more hardware processors coupled to the non-transitory memory and configured to read instructions from the non-transitory memory to cause the system to perform operations comprising:
retrieving a plurality of public cryptographic keys associated with a plurality of entities;
accessing a blockchain comprising a plurality of cryptographically signed audit records transmitted by a plurality of devices associated with the plurality of entities;
generating decrypted audit records by decrypting the plurality of cryptographically signed audit records in the blockchain using the plurality of public cryptographic keys, wherein the decrypted audit records comprise evaluations submitted by the plurality of entities for evaluating a plurality of websites;
identifying a portion of the decrypted audit records that is directed to a first website from the plurality of websites;
determining, from the plurality of entities, a set of entities that has contributed to the portion of the decrypted audit records;
discarding, for each entity in the set of entities, a portion of previous audit records that have been contributed by the entity based on one or more previous evaluations of websites different from the first website;
determining, for each entity in the set of entities, a reputation score based on a value representing a total number of audit records in the portion of the previous audit records that have been discarded;
assigning, to each audit record in the portion of the decrypted audit records, a corresponding weight based on the reputation score determined for the entity corresponding to the audit record;
determining a degree of consistency within the portion of the decrypted audit records;
modifying the portion of the decrypted audit records based at least in part on the degree of consistency and the weights assigned to the portion of the decrypted audit records by discarding at least one audit record from the portion of the decrypted audit records that has a weight below a threshold and/or deviates from other audit records in the portion of the decrypted audit records by more than a threshold amount;
determining a consensus content evaluation of the first website based on the modified portion of the decrypted audit records, wherein the consensus content evaluation represents an attribute of the first website;
storing the consensus content evaluation in the blockchain;
performing an action to a transaction account with a service provider used to conduct business via the first website based on the consensus content evaluation;

determining, from the plurality of entities, a first group of entities that contributed to the portion of the decrypted audit records directed to the first web site;

storing incentives for the first group of entities in the blockchain; and transmitting, to each entity in the first group of entities, an indication that auditing data from that entity was used in determining the consensus content evaluation.

2. The system of claim 1, wherein the determining the degree of consistency comprises determining a percentage of the portion of the decrypted audit records having matching content.

3. The system of claim 1, wherein the operations further comprise:

determining the threshold amount based on a number of audit records in the portion of the decrypted audit records.

4. The system of claim 1, wherein the operations further comprise:

creating, for the incentives, a cryptographically signed remuneration using a particular private cryptographic key corresponding to an entity associated with the system.

5. The system of claim 4, wherein the operations further comprise storing the cryptographically signed remuneration in the blockchain.

6. The system of claim 4, wherein the creating the cryptographically signed remuneration comprises encrypting, using a respective public cryptographic key, incentive information within the remuneration for each entity in the first group of entities.

7. The system of claim 6, wherein the operations further comprise:

receiving an encrypted redemption request from a particular entity in the first group of entities;

decrypting the redemption request using a public cryptographic key associated with the particular entity;

determining that the redemption request comprises the incentive information for the particular entity; and in response to determining that the redemption request comprises the incentive information, processing the redemption request.

8. The system of claim 1, wherein the plurality of cryptographically signed audit records specifies content scores for a plurality of content categories.

9. The system of claim 1, wherein the operations further comprise causing the plurality of cryptographically signed audit records to be stored in the blockchain.

10. A method, comprising:

retrieving a plurality of public cryptographic keys associated with a plurality of entities;

accessing, at a computer system, a blockchain comprising a plurality of cryptographically signed audit records transmitted by a plurality of devices associated with the plurality of entities;

generating, by the computer system, decrypted audit records by and decrypting the plurality of cryptographically signed audit records in the blockchain using the plurality of public cryptographic keys, wherein the decrypted audit records comprise evaluations submitted by the plurality of entities for evaluating a plurality of websites;

identifying, by the computer system, a portion of the decrypted audit records that is directed to a first website from the plurality of websites;

determining, by the computer system from the plurality of entities, a set of entities that has contributed to the portion of the decrypted audit records auditing data;

determining, by the computer system for each entity in the set of entities, a reputation score based on a number of previous audit records in the blockchain that were contributed by the entity and have been discarded during previous evaluations of web sites different from the first web site;

assigning, by the computer system to each audit record in the portion of the decrypted audit records, a corresponding weight based on the reputation score determined for the entity corresponding to the audit record;

determining, by the computer system, a degree of consistency within the portion of the decrypted audit records;

modifying, by the computer system, the portion of the decrypted audit records based at least in part on the degree of consistency and the weights assigned to the audit records in the portion of the decrypted audit records by discarding at least one audit record from the portion of the decrypted audit records that has a weight below a threshold and/or deviates from other audit records in the portion of the decrypted audit records by more than a threshold amount;

determining, by the computer system, a consensus content evaluation of the first website based on the modified portion of the decrypted audit records, wherein the consensus content evaluation represents an attribute of the first website;

storing, by the computer system, the consensus content evaluation in the blockchain;

performing, by the computer system, an action to a transaction account used to conduct business via the first website based on the consensus content evaluation;

determining, from the plurality of entities, a first group of entities that contributed to the portion of the decrypted audit records directed to the first website;

storing incentives for the first group of entities in the blockchain; and transmitting, to each entity in the first group of entities, an indication that auditing data from that entity was used in determining the consensus content evaluation.

11. The method of claim 10, wherein the computer system is configured to process electronic payment transactions for the plurality of websites.

12. The method of claim 10, further comprising transmitting a notification indicating that the first website should be manually reviewed by a human investigator based on the consensus content evaluation.

13. The method of claim 12, wherein the notification specifies one or more content categories for review.

14. The method of claim 10, wherein the action comprises suspending the transaction account associated with the first website.

15. The method of claim 10, further comprising:

determining the threshold amount based on a number of audit records in the portion of the decrypted audit record.

16. The method of claim 10, further comprising causing the plurality of cryptographically signed audit records to be stored in the blockchain.

17. A non-transitory machine-readable medium having stored thereon machine-readable instructions executable to cause a machine to perform operations comprising:

retrieving a plurality of public cryptographic keys associated with a plurality of entities;

accessing a blockchain comprising a plurality of cryptographically signed audit records transmitted by a plurality of devices associated with the plurality of entities;

generating decrypted audit records by decrypting the plurality of cryptographically signed audit records in the blockchain using the plurality of public cryptographic keys, wherein the decrypted audit records comprise evaluations submitted by the plurality of entities for evaluating a plurality of websites;

identifying a portion of the decrypted audit records that is directed to a first web site from the plurality of web sites;

determining, from the plurality of entities, a set of entities that has contributed to the portion of the decrypted audit records;

determining, for each entity in the set of entities, a reputation score based on a number of previous audit records contributed by the entity that have been discarded for evaluating websites different from the first website;

assigning, to each audit record in the portion of the decrypted audit records, a corresponding weight based on the reputation score determined for the entity corresponding to the audit record;

determining a degree of consistency within the portion of the decrypted audit records;

modifying the portion of the decrypted audit records based at least in part on the degree of consistency and the weights assigned to the portion of the decrypted audit records by discarding at least one audit record from the portion of the decrypted audit records that has a weight below a threshold and/or deviates from other audit records in the portion of the decrypted audit records by more than a threshold amount;

determining a consensus content evaluation of the first website from the plurality of websites based on the portion of the decrypted audit records, wherein the consensus content evaluation represents an attribute of the first website;

storing the consensus content evaluation in the blockchain;

performing an action to a transaction account with a service provider used to conduct business via the first website based on the consensus content evaluation;

determining, from the plurality of entities, a first group of entities that contributed to the portion of the decrypted audit records directed to the first website;

storing incentives for the first group of entities in the blockchain; and transmitting, to each entity in the first group of entities, an indication that a cryptographically generated signed audit record for that entity was used in determining the consensus content evaluation.

18. The non-transitory machine-readable medium of claim 17, wherein the determining the degree of consistency comprises determining a percentage of the portion of the decrypted audit record having identical content.

19. The non-transitory machine-readable medium of claim 17, wherein the operations further comprise determining the threshold amount based on a number of audit records in the portion of the decrypted audit record.

20. The non-transitory machine-readable medium of claim 17, wherein the operations further comprise causing the plurality of cryptographically signed audit records to be stored in the blockchain.

* * * * *

UNITED STATES PATENT AND TRADEMARK OFFICE
CERTIFICATE OF CORRECTION

| | |
|---|---|
| PATENT NO. | : 11,443,310 B2 |
| APPLICATION NO. | : 15/847622 |
| DATED | : September 13, 2022 |
| INVENTOR(S) | : Raja A. Bolla |

It is certified that error appears in the above-identified patent and that said Letters Patent is hereby corrected as shown below:

In the Claims

In Claim 10, Column 11, Lines 59-60 change "records by and decrypting the plurality of cryptographically signed audit records in the blockchain using the" to --records by decrypting the plurality of cryptographically signed audit records in the blockchain using the--

In Claim 10, Column 12, Line 3 change "portion of the decrypted audit records auditing data;" to --portion of the decrypted audit records;--

Signed and Sealed this
Seventeenth Day of January, 2023

Katherine Kelly Vidal
*Director of the United States Patent and Trademark Office*